US008880134B2

(12) United States Patent
Husband et al.

(10) Patent No.: US 8,880,134 B2
(45) Date of Patent: Nov. 4, 2014

(54) SUPERCONDUCTOR DEVICE

(75) Inventors: Stephen M. Husband, Derby (GB); Alexander C. Smith, Holmfirth (GB); Nigel Schofield, Manchester (GB); Andrew Oliver, Glossop (GB)

(73) Assignee: Rolls-Royce PLC, London (GB)

(*) Notice: Subject to any disclaimer, the term of this patent is extended or adjusted under 35 U.S.C. 154(b) by 380 days.

(21) Appl. No.: 13/282,804

(22) Filed: Oct. 27, 2011

(65) Prior Publication Data

US 2012/0115733 A1 May 10, 2012

(30) Foreign Application Priority Data

Nov. 5, 2010 (GB) .................................. 1018684.9

(51) Int. Cl.
*H01F 6/06* (2006.01)
*H02H 7/00* (2006.01)
*H01R 13/40* (2006.01)

(52) U.S. Cl.
CPC ..................................... *H01F 6/065* (2013.01)
USPC ............................. 505/220; 505/163; 361/19

(58) Field of Classification Search
CPC ........... H01L 39/16; H01L 39/02; H01F 5/02; H01F 5/04; H01F 6/06; H01R 4/68; H01R 13/40; H02H 9/02; H02H 9/023; H01B 12/16; H01B 12/02
USPC ................. 505/163, 220, 230, 232, 433, 850; 361/19, 141; 174/125.1, 15.4, 15.5
See application file for complete search history.

(56) References Cited

U.S. PATENT DOCUMENTS

| | | | |
|---|---|---|---|
| 4,270,264 A * | 6/1981 | Weisse | 29/599 |
| 2007/0222312 A1 | 9/2007 | Heinrich et al. | |
| 2009/0239751 A1 | 9/2009 | Lallouet et al. | |

FOREIGN PATENT DOCUMENTS

| | | | |
|---|---|---|---|
| JP | 10321271 * | 12/1998 | H01R 4/68 |
| JP | A-10-321271 | 12/1998 | |
| WO | WO 2009/010715 A1 | 1/2009 | |
| WO | WO 2009010715 A1 * | 1/2009 | H01F 5/02 |

OTHER PUBLICATIONS

British Search Report issued in British Application No. GB1018684.9 on Feb. 23, 2011.

* cited by examiner

*Primary Examiner* — Stanley Silverman
*Assistant Examiner* — Kallambella Vijayakumar
(74) *Attorney, Agent, or Firm* — Oliff PLC

(57) ABSTRACT

This invention relates to a superconductor device, comprising: a superconductor; a former which supports the superconductor; and, an intermediate electrical connector attached to the former for coupling the superconductor to a power source, wherein the intermediate electrical connector is connected to the superconductor via a deformable portion in the intermediate electrical connector, wherein the deformable portion allows relative movement between the superconductor and former.

20 Claims, 1 Drawing Sheet

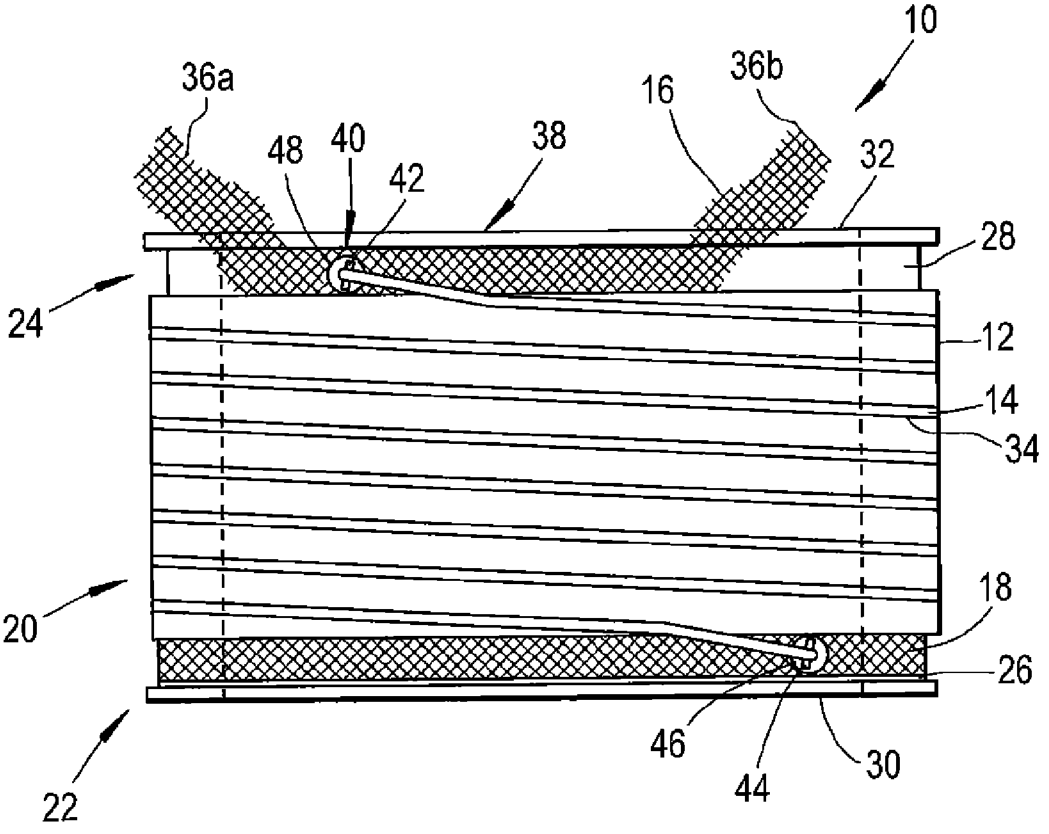
10
36a
16
36b
48
40
38
42
32
28
24
12
14
34
20
18
26
46
44
30
22

SUPERCONDUCTOR DEVICE

This invention relates to a superconductor device. In particular, this invention relates to a termination for a superconductor within a superconductor device.

Superconductors, for example superconducting wires, can have a low strain tolerance, typically 0.3% after being reacted. Hence, superconductors must be well supported both during and after fabrication to prevent damage.

One known method to help avoid damage to a superconductor involves providing a steel tube containing a powder of the constituent superconductor components around a former and sintering in situ to provide the superconductor. The superconductor and former can then be incorporated into a cryostat and connected to an electrical circuit as required. Although this addresses some of the known difficulties, placing the superconductor device in a cryostat and connecting the electric circuit can require significant amounts of handling which may result in mechanical damage.

The present invention seeks to overcome some of the problems with the prior art.

In a first aspect the present invention provides a superconductor device, comprising: a superconductor; a former which supports the superconductor; and, an intermediate electrical connector attached to the former for coupling the superconductor to a power source, wherein the intermediate electrical connector is connected to the superconductor via a deformable portion in the intermediate electrical connector, wherein the deformable portion allows relative movement between the superconductor and former.

Having a deformable portion allows the intermediate electrical connection to provide relative movement between the former and the superconductor. This reduces the mechanical strain placed on the superconductor during thermal expansion or contraction of the superconductor device.

A deformable portion may also be utilised to allow relative movement between the superconductor and a connection to a power source. Hence, the risk of damage to the superconductor device when connecting it to a power source and or during a thermal cycle, in use, can be reduced.

Reference is made throughout the specification to superconductors. It will be understood that the term superconductor is taken to include the constituent components of a superconducting material without actually being reacted so as to form a working superconductor. The term is also taken to include materials which are capable of superconduction but which are not necessarily in a superconducting state e.g. when they are above the critical temperature of the superconductor.

The superconductor device may form part of an actuator or a sensor. The actuator may be rotational or linear. The actuator may be a solenoid, motor or generator. The superconductor device may be part of an armature, rotor or a stator. The sensor may be a current sensor. Preferably, the superconducting device forms part of a current limiting device.

The superconductor may be one of the non-exhaustive group which includes a plate, sheet, strip or ribbon. Preferably, the superconductor is a wire. The superconductor may be arranged in a coil. The coil may be a bifilar coil.

The superconducting wire may comprise an outer sheath in which the constituent components of the superconducting material are housed in powder form. The outer sheath may be steel.

The superconducting wire may be one taken from the non-exhaustive group which includes: magnesium diboride, BSCCO, YBCO or N6Ti.

The cross section of the former may be round, for example, circular or oval. The cross section may be polygonal, for example, square or octagonal. The cross section may be regular or irregular. The former may be elongate. The former may be cylindrical.

The former may be constructed from a ceramic. Preferably, the former is made from Alumina.

The former may have a superconductor supporting section. The superconducting supporting section may be a formation in the surface of the former. The formation may be a recess. The recess may be an aperture, a groove or a notch. The formation may be a helix. The helix may be on the outer surface of the former. The former may support a plurality of superconductors. There may be a plurality of supporting sections.

The intermediate electrical connector may include a rigid portion. The rigid portion may be attached to the former. The rigid portion may include a termination for coupling to an external power source. Preferably, the intermediate electrical connector includes a flexible portion. The flexible portion may be located between an attachment to the former and a connection point for an external power source.

The intermediate electrical connector may be attached to the former with an adhesive. The intermediate electrical connector may be attached to the former with a mechanical fastener. The fastener may be a screw or a nut and bolt. Preferably, the intermediate electrical connector is attached to the former at a plurality of discrete locations.

Preferably, the intermediate electrical connector may be attached to the former adjacent the superconductor supporting section. It will be understood that for the purpose of present invention, adjacent includes next to and near to.

The intermediate electrical connector may include one or more terminals, each for receiving an electrical conductor. The electrical conductor may be coupled to a power source. The or each terminal may include a clamp. The clamp may include a screw or a nut and bolt arrangement. The terminal may include a plurality of clamps.

The intermediate electrical connector may be elongate. The intermediate electrical connector may be flat or round in cross section. The intermediate electrical connector may be a strip, plate or sheet of electrically conductive material. Preferably, the intermediate electrical connector is a strip of electrically conductive material. For example, the electrically conductive material can be copper.

The intermediate electrical connector may be fixed to the former along its entire length. Preferably, the intermediate electrical connector includes at least one free end which is not fixed to the former. The free end may be a loop. The loop may be connected at each end to the former or to itself. The intermediate electrical connector may be attached to the former along a mid portion so as to provide a plurality of free ends. Alternatively, the intermediate electrical connector is an endless loop.

Preferably, the intermediate electrical connector is a braided conductor. The superconductor may be connected to a face of the braided conductor. Preferably, the superconductor is held within the strands of the braided conductor.

The superconductor may be connected to the intermediate electrical connector by a mechanical fastener. Preferably, the mechanical fastener is a clamp. The superconductor may be additionally or independently connected to the intermediate electrical connector with solder or a conductive epoxy.

In a second aspect, the present invention provides a current limiting device which includes the superconducting device of the first aspect.

BRIEF DESCRIPTION OF THE DRAWING

FIG. 1 shows a superconductor device.

An embodiment of the invention will now be described with the aid of the FIGURE which shows a superconductor device according to the present invention.

The superconductor device 10 is for use as a superconducting fault current limiter. The device 10 includes a former 12 and a superconductor in the form of a coil of superconducting wire 14 wound around the former 12. The superconductor device 10 includes intermediate electrical connectors for coupling the superconductor 14 to a power source, which is not shown. The intermediate electrical connectors are attached to the former 12 and electrically connected to the ends of the superconducting wire 14. The intermediate electrical connectors are in the form of deformable braided conductors 16 18 which provide the connection between the former 12 and the superconductor 14 so as to allow relative movement therebetween.

The former 12 is an elongate cylindrical carrier having a body 20, a first end 22 and a second end 24. A circumferential channel 26 28 is located at each of the first 22 and second ends 24 so as to form a flange 30 32 on the end faces of the former 12. The body 20 of the former 12 includes a superconductor supporting section 34 in the form of a helical groove in the outer circumferential surface of the body 20. The groove is square in cross section and extends between the first and second end channels 26 28 such that the superconductor wire 14 can pass from the end of the groove directly into its respective channel 26 28.

Each of the first and second end channels 26 28 include an intermediate electrical connector 16 18 in the form of a length of flat electrically conductive braid. The use of a braid provides a deformable structure for anchoring the superconductor 14 to the former 12 such that relative movement is possible between the superconductor 14 and former 12. The relative movement is sufficient to reduce the strain placed on the superconductor 14 when the superconductor device 10 undergoes thermal expansion or contraction during use in a cryogen or during a quench event where the temperature in the superconductor device 10 increases rapidly. This is particularly useful in the present embodiment where the Alumina former and Magnesium Diboride have different coefficients of thermal expansion. It is to be noted that the deformation of the intermediate electrical connectors 16 18 is limited so that the superconductor 14 is held generally in place in relation to the former 12.

A further advantage of using a braid is that the alternating current, a.c., losses can be reduced due to the reduced skin effect which results from using a plurality of stranded conductors rather than a single conductor.

The braid 18 at the first end 22 is an endless loop which is seated and fixed within the first end channel 26 so as to encircle the former 12. The endless loop is formed from a length of braid 18 which has its ends soldered together once located in the channel 26. The braid 18 is retained in the channel 26 via the end face flange 30. However, it can be further fixed in place using adhesive which is applied in discrete locations around the circumference of the channel 26 should the application require it. Of course, the skilled person will appreciate the amount and type of adhesive required will be dependent on the application.

The braid 16 at the second end 24 is seated within the channel 28 and extends about an arc of approximately ninety degrees of the circumference of the former 12. The second end braid 16 includes free ends **36*a* 36*b* in the form of flexible tails which extend away from the body 20 of the former 12 so as to provide a connection point for an external power source (not shown). The fixed portion 38 of the braid 16 is adhered to the former 12 along a mid portion 40 in discrete locations so as to provide a plurality of anchor points whilst allowing the braid 16 to deform and move relative to the former 12**.

The flexibility of the free ends **36*a* 36*b* provides freedom in the connection of an external power source to the superconductor device 10 in that they can be moved without disturbing the superconductor 14**. This freedom is particularly useful where a high voltage power source is used and the supply conductors are heavily insulated and comparatively rigid.

Having two free ends **36*a* 36*b* for connection to the power source is advantageous as it allows the cross sectional area of the comparatively high resistance conductive braid to be effectively doubled which results in a halving of the current density in each free end 36*a* 36*b*. This allows the size of the conductive braid 16** to be comparatively reduced.

The superconducting wire 14 is wound around the former 12 within the groove in circumferential surface. The ends of the superconducting wire 14 extend into the braid 16 18 where they are held by clamps 42, 44. The clamps 42 44 includes two identical elongate plates which are placed against the flat width of the braid 16 18 on each side. The plates include apertures positioned on opposite sides of the braid 16 18 such that a pair of nut and bolts can be received and tightened down to clamp 42 44 the superconductor wire 14 and braid within the plates. The purpose of the clamp 42 44 is to hold the ends of the superconductor wire 14 in place for sintering.

The ends of the superconducting wires are additionally soldered 46 48 to the braids 16 18 (after sintering) which provides a strong mechanical connection with a low electrical resistivity due to the large surface contact area between the solder 46 48 and the strands of the braid 16 18.

The former 12 is made from alumina which is capable of withstanding the sintering process required to create the superconductor 14. An example of a former which may be adapted to carry out the invention is described in patent application number PCT/GB2008/002040. The superconductor 14 is made from magnesium diboride. The braids 16 18 and clamps 42 44 are made from copper. The skilled person will appreciate that other materials may be used for the former 12, superconductor 14, intermediate electrical connector 16 18 and clamps 42 44.

To make the superconductive device 10 of the embodiment, the first braid 18 is looped around the former 12 in the first end channel 26 and its ends are soldered together to provide the endless loop. The second braid 16 is temporarily fixed to the former using copper G-clamps. The superconducting wire 14 is wound around the body 20 of the former 12 in the groove of the superconducting support section 34 to a predetermined tension. The skilled person will appreciate the tension will be dependent on the superconductor 14 used, the geometry of the device 10 and the sintering process used. The ends of the superconducting wire 14 are placed within the respective braid 16 18 so as to follow the angle of the helical groove thereby minimising any potentially damaging mechanical strain in the superconductor 14 during manufacture and operation. Once inserted into the braids 16 18 and the position and tension of the superconducting wire 14 and braids 16 18 adjusted as necessary, the ends are held in place with the clamps 42 44. The superconductor device 10 is then sintered between 750 degrees centigrade and 900 degrees centigrade for a predetermined period time of between five and ten minutes. The skilled person will appreciate that a suitable temperature profile will need to be applied to prevent stresses in the wire. For example, the superconducting device may need to be heated or cooled over a period of a few hours.

Once cooled the superconducting wire 14 is soldered 46 48 to the braids 16 18 to ensure a good electrical connection.

Prior to removal of the G-clamps the braids 16 18 are adhered to the former 10 in discrete spots so as to provide the necessary mechanical retention.

In use, the superconductor device 10 can be located within a cryostat and a power source connected to the first and second free ends 36*a* 36*b* and the face of the endless loop of the first end braid 18.

The above embodiment is not to be taken as a limitation of the invention.

The invention claimed is:

1. A superconductor device, comprising:
a superconductor;
a former which supports the superconductor; and
an intermediate electrical connector attached to the former that couples the superconductor to a power source,
wherein the intermediate electrical connector is connected to the superconductor via a deformable portion in the intermediate electrical connector,
wherein the intermediate electrical connector comprises a rigid portion attached to the former, and
wherein the deformable portion allows relative movement between the superconductor and former.

2. A superconductor device as claimed in claim 1 wherein the intermediate electrical connector includes a flexible portion.

3. A superconductor device as claimed in claim 1 wherein the intermediate electrical connector is a strip of electrically conductive material.

4. A superconductor device as claimed in claim 1 wherein the intermediate electrical connector comprises a braided conductor.

5. A superconductor device as claimed in claim 4 wherein the superconductor is held within the strands of the braided conductor.

6. A superconductor device as claimed in claim 1 wherein the intermediate electrical connector includes at least one free end.

7. A superconductor device as claimed in claim 1 wherein the intermediate electrical connector is attached to the former along a mid-portion so as to provide a plurality of free ends.

8. A superconductor device as claimed in claim 1 wherein the intermediate electrical connector is an endless loop.

9. A superconductor device as claimed in claim 1 wherein the intermediate electrical connector is attached to the former at a plurality of discrete locations.

10. A superconductor device as claimed in claim 1 wherein the former includes a superconductor supporting section and the intermediate electrical connector is attached to the former adjacent the superconductor supporting section.

11. A superconductor device as claimed in claim 1 wherein the superconductor is connected to the intermediate electrical connector using a clamp and solder.

12. A current limiting device comprising the superconducting device of claim 1.

13. A superconductor device, comprising:
a superconductor;
a former which supports the superconductor; and,
an intermediate electrical connector attached to the former that couples the superconductor to a power source,
wherein the intermediate electrical connector comprises a flexible portion located between an attachment to the former and a connection point for the power source,
wherein the intermediate electrical connector is connected to the superconductor via a deformable portion in the intermediate electrical connector, and
wherein the deformable portion allows relative movement between the superconductor and former.

14. A superconductor device as claimed in claim 13, wherein the intermediate electrical connector is a strip of electrically conductive material.

15. A superconductor device as claimed in claim 13, wherein the intermediate electrical connector comprises a braided conductor.

16. A superconductor device as claimed in claim 15, wherein the superconductor is held within the strands of the braided conductor.

17. A superconductor device as claimed in claim 13, wherein the intermediate electrical connector includes at least one free end.

18. A superconductor device as claimed in claim 13, wherein the intermediate electrical connector is attached to the former along a mid-portion so as to provide a plurality of free ends.

19. A superconductor device as claimed in claim 13, wherein the intermediate electrical connector is an endless loop.

20. A superconductor device as claimed in claim 13, wherein the intermediate electrical connector is attached to the former at a plurality of discrete locations.

* * * * *